Sept. 28, 1965   J. E. LANDERS ETAL   3,208,928
REFERENCE ELECTRODE BRIDGE ASSEMBLY Filed May 7, 1962   2 Sheets-Sheet 1

INVENTORS
J. E. LANDERS &
BY   O. L. RIGGS JR.

United States Patent Office 3,208,928
Patented Sept. 28, 1965

3,208,928
REFERENCE ELECTRODE BRIDGE ASSEMBLY
James E. Landers and Olen L. Riggs, Jr., Ponca City, Okla., assignors to Continental Oil Company, Ponca City, Okla., a corporation of Delaware
Filed May 7, 1962, Ser. No. 192,849
2 Claims. (Cl. 204—196)

This invention relates generally, as indicated, to an electrode bridge assembly. More particularly, but not by way of limitation, the present invention relates to an improved bridge assembly particularly adapted for use in an anodic passivation system.

Significant progress has been made in recent years in development of the technique of minimizing corrosion of a vessel containing a corrosive solution by anodically passivating the vessel. In this technique a standard reference electrode is placed in electrical communication with the corrosive solution in the vessel, and the potential between the reference electrode and the vessel is monitored. This potential is used to control the flow of current from the vessel to an electrode immersed in the corrosive solution. The potential between the reference electrode and the vessel indicates the degree of passivity of the vessel, and the anodic current is normally controlled in an "on" and "off" manner to maintain the potential between the reference electrode and the vessel in a predetermined range where corrosion of the vessel is retained at a minimum.

In many processes the corrosive solution in the vessel is highly acidic or alkaline and would damage most standard reference electrodes if it were to come in contact with the conventional electrodes. Thus, it is the usual practice to provide a reservoir of an electrolyte remote from the vessel, which electrolyte will not damage the standard reference electrode. The reference electrode is immersed in the electrolyte, and the electrolyte is in turn connected to the corrosive solution in the vessel by a bridge assembly including a weeping glass bridge supported in the corrosive solution. The electrolyte reservoir is supported physically above the vessel, such that the electrolyte will tend to fill the weeping glass bridge and drip very slowly from the weeping glass bridge into the solution. This provides an electrochemical bridge between the solution and the reference electrode. Such a system works very well when the pressure in the vessel does not substantially exceed atmospheric pressure. However, when the pressure in the vessel is relatively high, the electrolyte will not drip from the lower end of the weeping glass bridge and the electrochemical communication between the solution and the electrolyte is frequently interrupted. In fact, the pressure in the vessel has been known to force the solution upwardly through the weeping glass bridge and into the electrolyte reservoir when the pressure in the vessel is sufficiently high.

The present invention contemplates a novel anodic passivation system particularly adapted for use in protecting vessels containing corrosive solutions at elevated pressures. More specifically, the present invention contemplates the use of a pressure-tight reservoir placed in communication with the vessel being protected through the medium of a semiporous barrier which forms an ionic bridge between electrolyte in the reservoir and the corrosive solution in the vessel. The standard reference electrode is immersed in the electrolyte in the reservoir and the pressure in the reservoir is maintained at substantially the same pressure as the internal pressure of the vessel, without the flow of the corrosive solution into the reservoir. In one embodiment of this invention, the pressure of the reservoir is controlled directly by the pressure in the vessel through the use of a conduit communicating with the vessel above the level of the corrosive solution and communicating with the reservoir above the level of the electrolyte. This type of system is particularly suited for pressure vessels wherein the corrosive solution is maintained below a predetermined level and is not violently agitated. In another embodiment of this invention, the pressure of the reservoir is maintained by a pressurized gas (preferably inert) wherein the flow of the pressurized gas to and from the reservoir is controlled by the pressure in the vessel.

An important object of this invention is to efficiently minimize corrosion of a vessel containing a corrosive solution under pressure.

Another object of this invention is to protect a standard reference electrode from contact with a corrosive solution in a pressurized vessel during anodic passivation of the vessel.

A further object of this invention is to provide an electrochemical bridge between a standard reference electrode and a corrosive solution under pressure, wherein the standard reference electrode will be in constant electrical communication with the corrosive solution during anodic passivation of the vessel.

Another object of this invention is to minimize contamination of a corrosive solution during anodic passivation of a vessel containing the corrosive solution.

A still further object of this invention is to provide a simply constructed anodic passivation system which may be economically manufactured and which will have a long service life.

Other objects and advantages of the invention will be evident from the following detailed description, when read in conjunction with the accompanying drawings which illustrate the invention.

Figure 1:
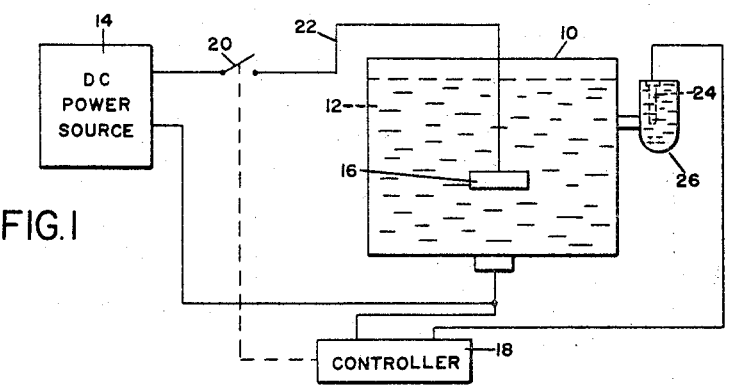
FIGURE 1 is a schematic illustration of a complete anodic passivation system constructed in accordance with this invention.

Referring to the drawings in detail, and particularly FIGURE 1, reference character 10 designates a closed vessel which is to be protected from a corrosive solution 12 by the anodic control system of this invention. The corrosive solution 12 is an electrolyte and may be either acidic or alkyline. A source 14 of direct current energy is connected to the vessel 10 and to an electrode 16 positioned in the solution 12 to pass an anodic current through the solution 12 and passivate the exposed inner surfaces of the vessel 10 against corrosive attack by the solution 12.

The anodic current is controlled by a suitable controller 18 connected to the energy source 14 by a switch 20 interposed in the conductor 22 leading from the source 14 to the electrode 16. The controller 18 is connected across the vessel 10 and a standard reference electrode 24 which communicates with the solution 12 through a bridge assembly, generally designated by reference character 26, to monitor the potential between the vessel 10 and the standard electrode 24. The standard electrode 24 may be of any desired type, such as a calomel half cell, a mercury-mercurous sulfate cell or a silver-silver chloride cell.

Figure 2:
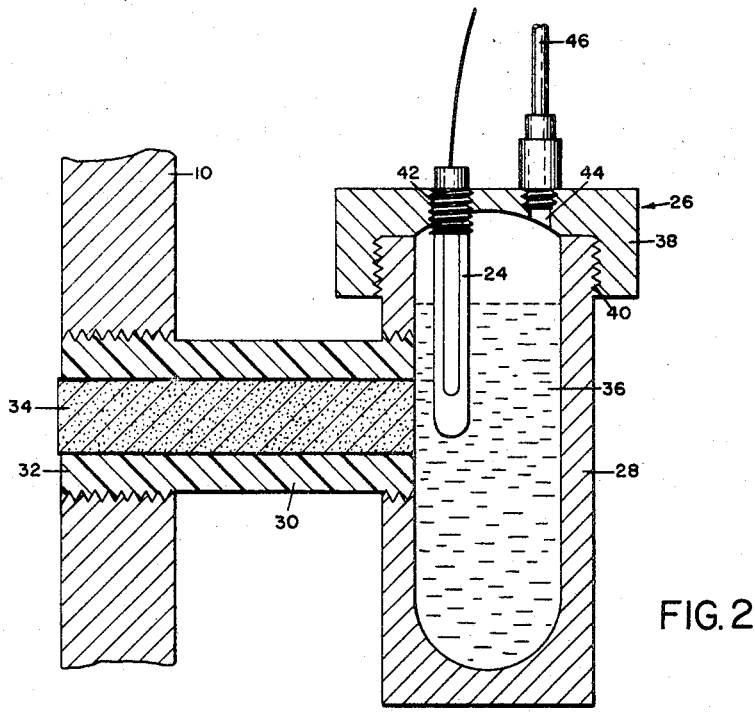
FIGURE 2 is a vertical sectional view through the reference electrode bridge assembly of the system shown in FIGURE 1.

As shown in FIGURE 2, the bridge assembly 26 generally comprises a reservoir 28 connected to a side wall of the tank 10 by a conduit 30, with the conduit 30 being positioned below the level of the solution 12 in the vessel 10. The end 32 of the conduit 30 is exposed to the corrosive solution 12 and thus the conduit should be either of the same material as the vessel 10 or an inert material to prevent erroneous readings in the potential between the vessel 10 and the reference electrode 24 and to prevent contamination of the solution 12. When the conduit 30 is of the same material as the vessel 10, the end 32 thereof will be subject to corrosion to the same extent as the vessel 10. When the conduit 30 is an inert material with respect to the solution 12, such as various types of plastics, the anodic current will not be directed to the end 32 of the conduit to interfere with the potential readings, nor will the end 32 of the conduit be corroded to contaminate the solution 12.

A semiporous barrier 34 is secured in the conduit 30 to prevent the flow of the solution 12 through the conduit 30 into the electrolyte reservoir 28, and to prevent electrolyte 36 in the reservoir from flowing into the vessel 10. The barrier 34 may be of any desired construction, but is preferably an inert material in the form of a plug wedged into the conduit 30. The porosity of the barrier 34 must be such that neither the solution 12 nor the electrolyte 36 will flow therethrough, yet allow the flow of ions between the solution and the electrolyte to provide an ionic bridge between the vessel 10 and the electrolyte 36. It has been found that a permeability of 0.5 md. or less is suitable for this purpose.

The electrolyte 36 may be of any desired composition, such as saturated KCl, which would effectively provide the flow of current to and from the standard electrode 24 immersed therein. It will also be noted that the level of the electrolyte 36 is above the level of the conduit 30 to assure that the electrolyte is constantly in communication with the semiporous barrier 34.

A cap or cover 38 is secured on the upper end of the reservoir 28 in any suitable manner, such as by threads 40, to make the reservoir 28 pressure-tight. The reference electrode 24 may be easily threadedly secured in the cap 38 by threads 42. A pressurizing port 44 is also provided in the cap 38 to receive one end of a pressurizing conduit 46 in order to control the pressure in the reservoir 28, as illustrated in FIGURES 3 and 4.

Figure 3:
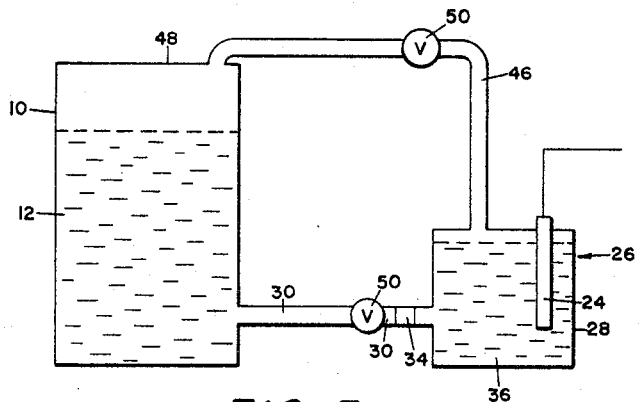
FIGURE 3 is a schematic illustration of one embodiment of this invention wherein the pressure of the electrolyte reservoir is maintained directly from the pressure in the vessel being protected.

As shown in FIGURE 3, the conduit 46 may be simply extended into connection with the upper end 48 of the vessel 10 to provide a direct pressurizing of the reservoir 28 from the vessel 10. It will be observed that the conduit 46 communicates with the reservoir 28 above the level of the electrolyte 36 and communicates with the vessel 10 above the level of the solution 12. Thus, the pressure in the reservoir 28 will be retained at the same pressure as the pressure in the vessel 10 without either the transfer of solution 12 into the reservoir 28 or the transfer of electrolyte 36 from the reservoir 28 into the vessel 10, to completely protect the reference electrode 24 and prevent contamination of the corrosive solution 12. This embodiment of the invention is particularly useful in processes wherein the solution 12 will not be raised to a level to enter the conduit 46, and in processes wherein the solution 12 is not violently agitated. It will also be observed in FIGURE 3 that suitable valves 50 are interposed in the conduit 46 and in the conduit 30 between the vessel 10 and the barrier 34 in order to isolate the reservoir 28 from the vessel when it is desired to repair or replace any portion of the bridge assembly 26.

Figure 4:
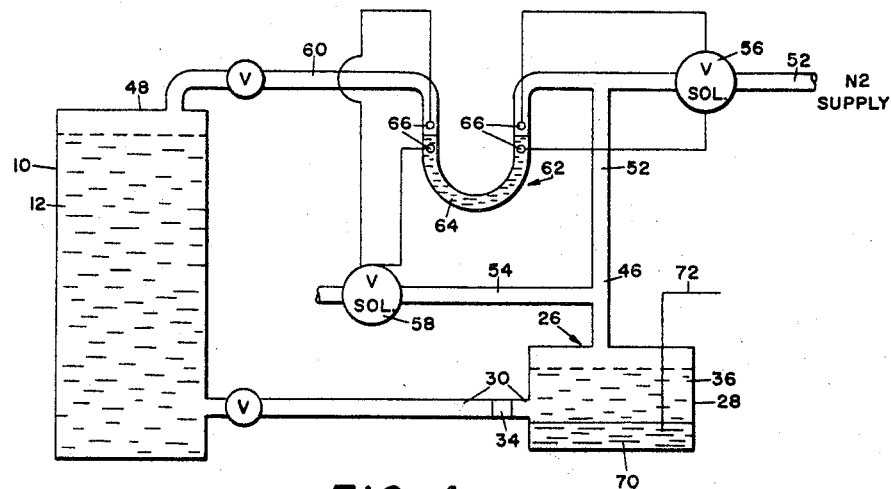
FIGURE 4 is a schematic illustration of another embodiment of this invention wherein the pressure of the electrolyte reservoir is maintained by a pressurized gas.

The embodiment shown in FIGURE 4 is particularly useful in processes wherein the solution 12 is likely to completely fill the vessel 10, or whenever there is any possibility of a direct transfer of the solution 12 through a conduit connected to the top of the vessel. In this embodiment, the conduit 46 is connected to a feed conduit 52 and a discharge conduit 54. The feed conduit 52 is connected to a suitable supply (not shown) of an inert gas having a pressure at least as great as the highest pressure to be encountered in the vessel 10. It has been found that nitrogen is a very suitable gas for use. A solenoid valve 56 is interposed in the feed conduit 52 to control the flow of the gas into the upper end of the reservoir 28, as will be described. A solenoid valve 58 is also interposed in the exhaust or discharge conduit 54 to relieve the pressure from the reservoir 28, as will be described.

The feed conduit 52 is connected to the top 48 of the vessel 10 by another conduit 60 having a U-tube 62 formed therein. A supply 64 of mercury is contained in the U-tube 62 to monitor any difference in pressure between the vessel 10 and the reservoir 28. When the pressures in the vessel 10 and the reservoir 28 are equal, the mercury 64 will stand at the same height in the opposite legs of the U-tube 62, and upon a variation of pressure in either of the vessel 10 or the reservoir 28, the mercury 64 will move toward the lower pressure. Suitable contacts 66 are positioned in the opposite legs of the U-tube 62 above and below the normal level of the mercury 64. The set of contacts 66 positioned in the leg of the U-tube 62 adjacent the reservoir 28 are connected to the solenoid valve 56, and the contacts 66 in the opposite leg of the U-tube are connected to the solenoid valve 58 positioned in the discharge conduit 54.

As will be apparent to those skilled in the art, the right-hand contacts 66 will close and energize the solenoid valve 56 when the pressure in the reservoir 28 decreases below the pressure in the vessel 10 to open the valve 56 and feed a supply of gas into the reservoir 28 for equalizing the pressures. When the pressure in the vessel 10 and the reservoir 28 are again equalized, the right-hand contacts 66 open and the solenoid valve 56 is de-energized and closes. Conversely, when the pressure in the vessel 10 is decreased below the pressure in the reservoir 28, the left-hand contacts 66 are closed to open the solenoid valve 58 and provide a discharge of a portion of the gas from the reservoir 28 through the discharge conduit 54. When the pressure in the vessel 10 and the reservoir 28 are again equalized, the left-hand contacts 66 will be opened and the solenoid valve 58 will close.

FIGURE 4 also illustrates the use of another type of standard reference electrode. Instead of the type of electrode 24 which is suspended in the electrolyte 36, we may use a body 70 of mercury-mercury chloride in the bottom of the reservoir 28 below the conduit 30, along with a conductor 72 extending from the body 70 through the top of the reservoir, if desired.

From the foregoing, it will be apparent that the present invention provides an anodic passivation reference electrode system which is particularly useful in a process wherein the vessel being protected is operated at superatmospheric pressures. The corrosive solution in the vessel and the electrolyte in the electrolyte reservoir are in constant contact with the opposite ends of the semiporous barrier which forms an ionic bridge between the solution and the electrolyte. However, the pressure across the semiporous barrier is retained at substantially zero to prevent the forcing of either the solution 12 or the electrolyte through the barrier. It will thus be apparent that the standard reference electrode is completely isolated from the corrosive solution in the vessel being protected and the electrolyte will not flow into the vessel being protected to contaminate the corrosive solution. The present system is useful either with process vessels subjected to varying levels of the solution therein, as well as process vessels wherein the solution in the vessel is retained below a predetermined maximum level and is not violently agitated, such as in a storage vessel.

Changes may be made in the combination and arrangement of parts or elements, as well as in steps and procedures, as heretofore set forth in the specification and shown in the drawings, it being understood that changes may be made in the embodiments disclosed without departing from the spirit and scope of the invention as defined in the following claims.

What is claimed is:

1. In a system for anodically minimizing corrosion of a vessel having a top and a bottom and containing a corrosive electrolytic solution under pressure, the combination of:
   a reservoir having a top and a bottom and adapted to contain a supply of electrolyte;
   a conduit connecting the bottom of the reservoir to the bottom of the vessel whereby said solution and said electrolyte will gravitate into the opposite ends thereof;
   a semi-porous barrier mounted in and filling said conduit, thereby preventing flow of the solution into the reservoir and preventing flow of the electrolyte into the vessel while forming an ionic bridge between the solution and the electrolyte;
   a standard electrode secured in the reservoir in contact with the electrolyte;
   a supply of pressurized gas;
   a gas feed conduit connecting the supply of pressurized gas to the reservoir above the level of the electrolyte;
   a gas discharge conduit connected to the reservoir above the level of the electrolyte;
   valves in said feed and discharge conduits;
   means for sensing the pressure in the vessel and the reservoir; and
   means connected to said sensing means for selectively opening and closing said valves in accordance with the relative pressures in the vessel and the reservoir to maintain the pressure substantially equal in the vessel and in the reservoir.

2. A system as defined in claim 1 wherein:
   said valves are solenoid valves;
   said means for sensing the pressures in the vessel and the reservoir comprises a conduit communicating with the vessel above the level of the solution in the vessel and communicating with the reservoir above the elevel of the electrolyte in the reservoir, a U-tube interposed in the last mentioned conduit, and a body of mercury in said U-tube; and
   said means for selectively opening and closing said valves comprises contacts positioned in the opposite sides of the U-tube and connected to said valves, said contacts being arranged to open and close the respective valve circuits upon movement of the mercury.

References Cited by the Examiner

UNITED STATES PATENTS

| 2,697,070 | 12/54 | Arthur. | |
| 2,846,386 | 8/58 | Ingruber | 204—195 |
| 2,930,967 | 3/60 | Laird et al. | 204—195 |
| 3,009,865 | 11/61 | Muller et al. | 204—147 |

FOREIGN PATENTS 1,245,108  9/60  France.

JOHN H. MACK, *Primary Examiner.*

JOHN R. SPECK, MURRAY TILLMAN, WINSTON A. DOUGLAS, *Examiners.*